(12) United States Patent
Turocy et al.

(10) Patent No.: US 9,691,233 B2
(45) Date of Patent: *Jun. 27, 2017

(54) CASSETTE FOR USE WITH AN AUTOMATED BANKING MACHINE THAT CAN RECEIVE POWER AND COMMUNICATE VIA MAGNETIC INDUCTION

(71) Applicant: DIEBOLD SELF-SERVICE SYSTEMS, DIVISION OF DIEBOLD, INCORPORATED, North Canton, OH (US)

(72) Inventors: Kenneth Turocy, Wadsworth, OH (US); William Beskitt, Canton, OH (US); Mike Ryan, Canton, OH (US); Eric Klein, Massillon, OH (US); David A. Peters, Tallmadge, OH (US); H. Thomas Graef, Bolivar, OH (US)

(73) Assignee: Diebold Self-Service Systems, Division of Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/262,476

(22) Filed: Sep. 12, 2016

(65) Prior Publication Data

US 2016/0379452 A1    Dec. 29, 2016

Related U.S. Application Data

(63) Continuation of application No. 14/212,959, filed on Mar. 14, 2014, now Pat. No. 9,443,399.

(60) Provisional application No. 61/782,740, filed on Mar. 14, 2013.

(51) Int. Cl.
| | |
|---|---|
| G06Q 40/00 | (2012.01) |
| G07F 19/00 | (2006.01) |
| G07F 9/06 | (2006.01) |
| G07D 11/00 | (2006.01) |
| G06Q 20/10 | (2012.01) |

(52) U.S. Cl.
CPC ....... *G07F 19/201* (2013.01); *G06Q 20/1085* (2013.01); *G07D 11/0006* (2013.01); *G07D 11/0042* (2013.01); *G07D 11/0048* (2013.01); *G07D 11/0078* (2013.01); *G07F 9/06* (2013.01); *G07F 19/203* (2013.01)

(58) Field of Classification Search
CPC ....... G07F 11/00; G07F 9/06; G06Q 20/1085; G06Q 20/12; G06Q 20/20
See application file for complete search history.

(56) References Cited

U.S. PATENT DOCUMENTS

| | | | | |
|---|---|---|---|---|
| 4,992,648 A | * | 2/1991 | Hutchison | ............ G06K 7/1097 235/379 |
| 5,012,075 A | * | 4/1991 | Hutchison | .......... G07D 11/0009 109/43 |

(Continued)

*Primary Examiner* — Thien M Le
*Assistant Examiner* — April Taylor
(74) *Attorney, Agent, or Firm* — Black, McCuskey, Souers & Arbaugh, LPA

(57) ABSTRACT

In an example embodiment, a document holding cassettes that can be used in an automated banking machine that includes circuitry that is wirelessly powered through inductive coupling. The cassette can wirelessly communicate with the automated banking machine through induction.

20 Claims, 6 Drawing Sheets

(56) References Cited

U.S. PATENT DOCUMENTS

| | | | | |
|---|---|---|---|---|
| 5,930,304 A * | 7/1999 | Hollenbeck | ........... | G06K 13/077 375/259 |
| 6,302,393 B1 * | 10/2001 | Beskitt | ................... | B65H 29/06 271/187 |
| 7,032,822 B2 * | 4/2006 | Waters | ................. | G06K 7/1097 235/436 |
| 8,887,995 B2 * | 11/2014 | Seibert | ............... | G07D 11/0006 235/379 |
| 2012/0322375 A1 * | 12/2012 | Hirsch | .................... | H04L 63/18 455/41.1 |

* cited by examiner

CASSETTE FOR USE WITH AN AUTOMATED BANKING MACHINE THAT CAN RECEIVE POWER AND COMMUNICATE VIA MAGNETIC INDUCTION

CROSS REFERENCE TO RELATED APPLICATIONS

This application is a continuation of U.S. application Ser. No. 14/212,959 filed on Mar. 14, 2014, now U.S. Pat. No. 9,443,399, that claims the benefit of U.S. Provisional Application No. 61/782,740 filed on Mar. 14, 2013. The contents of the aforementioned applications are hereby incorporated by reference in its entirety.

TECHNICAL FIELD

This invention pertains to automated banking machines.

BACKGROUND

Automated banking machines may include a card reader that operates to read data from a bearer record such as a user card. The automated banking machine may operate to cause the data read from the card to be compared with other computer stored data related to the bearer. The machine operates in response to the comparison determining that the bearer is an authorized system user to carry out at least one transaction which is operative to transfer value to or from at least one account. A record of the transaction is also commonly printed through operation of the automated banking machine and provided to the user. A common type of automated banking machine used by consumers is an automated teller machine (ATM) which enables customers to carry out banking transactions. Banking transactions carried out may include the dispensing of cash, the making of deposits, the transfer of funds between accounts and account balance inquiries. The types of transactions a customer can carry out with an automated transaction machine are determined by the capabilities of the particular machine and the programming associated with operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine, an automated transaction machine, or an ATM shall be deemed to include any machine that may be used to electronically carry out transactions involving automated transfers of value.

OVERVIEW OF EXAMPLE EMBODIMENTS

The following presents a simplified overview of an example embodiments in order to provide a basic understanding of some aspects of an example embodiments. This overview is not an extensive overview of an example embodiments. It is intended to neither identify key or critical elements of an example embodiments nor delineate the scope of the appended claims. Its sole purpose is to present some concepts of an example embodiments in a simplified form as a prelude to the more detailed description that is presented later.

In accordance with an example embodiment, there is disclosed herein, an apparatus, comprising a currency cassette. The currency cassette removably positionable from an operating position within an automated banking machine. The currency cassette is configured to hold a plurality of currency notes. The currency cassette comprises an internal electrical power circuit that comprises a first coil, a power supply and a controller. The currency cassette is operable to receive power and data via magnetic coupling of the first coil that is coupled with the power supply with the automated banking machine. The controller is operable to receive power from the power supply. The controller is operable to send data to the automated banking machine by changing magnetic field of the first coil.

DESCRIPTION OF EXAMPLE EMBODIMENTS

Figure 1:
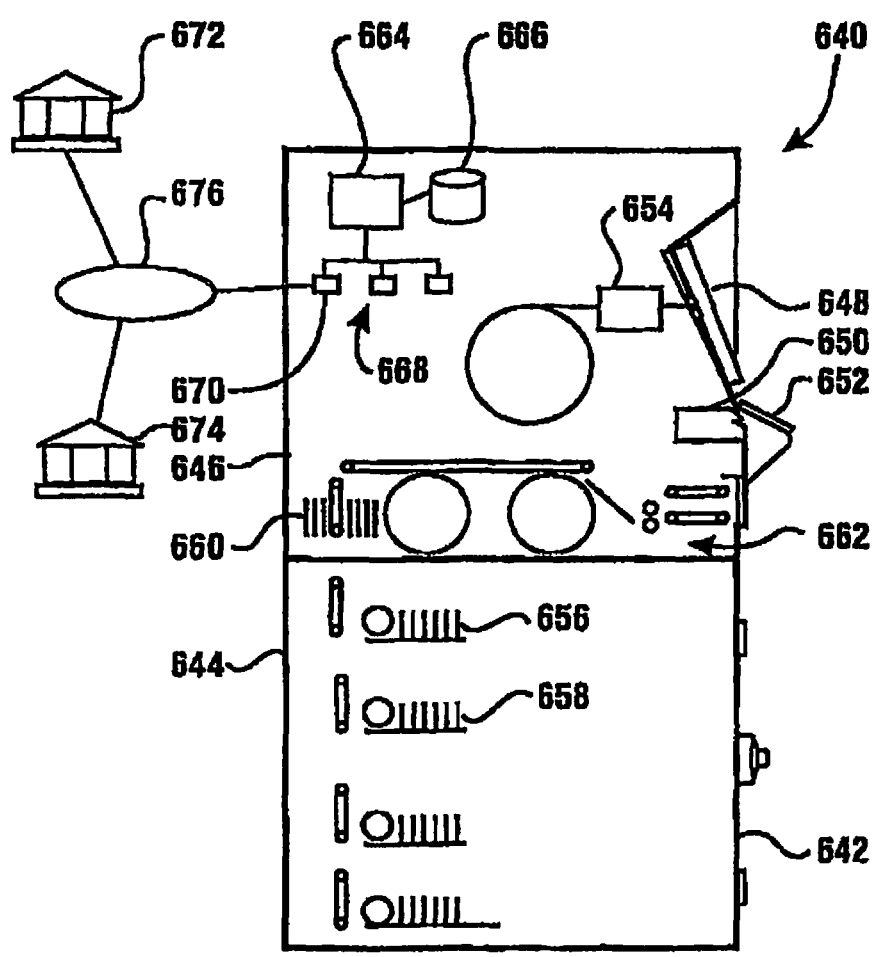
FIG. 1 is a schematic view showing an automated banking machine with an alternative example deposit accepting device.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 shows an alternative example embodiment of an automated banking machine 640. Banking machine 640 includes a housing 642. Housing 642 of the machine includes a chest portion 644 and an upper housing portion 646. Chest portion 644 provides a secure storage area in an interior portion thereof. The interior of the chest portion may be used for example to store valuable sheets such as currency notes, travelers checks, scrip, checks, tickets or other valuable sheets that have been received by and/or that are to be dispensed from the machine. The chest portion includes a suitable chest door and lock for providing authorized access thereto. The upper housing portion 646 of an example embodiment also includes suitable access doors or other mechanisms to enable authorized persons to obtain access to items therein. Examples of chest portions are shown in U.S. Pat. No. 7,000,830 and U.S. Application. 60/519,079, the disclosures of which are incorporated herein by reference in their entirety.

The example automated banking machine 640 includes output devices including a display 648. Other output devices may include for example speakers, touch pads, touch screens or other items that can provide user receivable outputs. The outputs may include outputs of various types including for example, instructions related to operation of the machine. The example automated banking machine further includes input devices. These may include for example a card reader 650 or a biometric reader. The biometric type of reading device may identify a machine user by a characteristic thereof. Such biometric reading devices may include for example a fingerprint reader, iris scanner, retina scanner, voice recognition device, hand scanner, DNA scanner, implanted chip reader, facial recognition reader, and/or software or other devices.

The card reader 650 is operative to read indicia included on cards that are associated with a user and/or a user's account. Card readers may be operative to read indicia for example, indicia encoded on a magnetic stripe, data stored in an electronic memory on the card, radiation transmitted from an item on the card such as a radio frequency identification (RFID) chip or other suitable indicia. User cards represent one of a plurality of types of data bearing records that may be used in connection with activating the operation of example machines. In other embodiments other types of data bearing records such as cards, tokens, tags, sheets or other types of devices that include data that is readable therefrom, may be used.

In example embodiments data is read from a card through operation of a card reader. The card reader may include features such as those disclosed in U.S. Pat. No. 7,118,031, the disclosure of which is incorporated herein by reference in its entirety. The example automated banking machine is operative responsive to at least one processor in the machine to use data read from the card to activate or allow operation of the machine by authorized users so as to enable such users to carry out at least one transaction. For example the machine may operate to cause data read from the card and/or data resolved from card data and other inputs or data from the machine, to be compared to data corresponding to authorized users. This may be done for example by comparing data including data read from the card to data stored in or resolved from data stored in at least one data store in the machine. Alternatively or in addition, the automated banking machine may operate to send one or more messages including data read from the card or data resolved therefrom, to a remote computer.

The remote computer may operate to cause the data received from the machine to be compared to data corresponding to authorized users based on data stored in connection with one or more remote computers. In response to the positive determination that the user presenting the card is an authorized user, one or more messages may be sent from the remote computer to the automated banking machine so as to enable operation of features thereof. This may be accomplished in some example embodiments through features such as those described in U.S. Pat. Nos. 7,284,695 and/or 7,266,526, the disclosures of each of which are incorporated herein by reference in their entirety. Of course these approaches are example and in other embodiments other approaches may be used.

The example automated banking machine further includes a keypad 652. Keypad 652 provides a user input device which includes a plurality of keys that are selectively actuatable by a user. Keypad 652 may be used in example embodiments to enable a user to provide a personal identification number (PIN). The PIN data may be used to identify authorized users of the machine in conjunction with data read from cards so as to assure that machine operation is only carried out for authorized users. Of course the input devices discussed herein are example of numerous types of input devices that may be used in connection with automated banking machines.

The example automated banking machine further includes other transaction function devices. These may include for example, a printer 654. In an example embodiment printer 654 is operative to print receipts for transactions conducted by users of the machine. Other embodiments of automated banking machines may include other types of printing devices such as those suitable for printing statements, tickets or other types of documents. The example automated banking machine further includes a plurality of other devices. These may include for example, a sheet dispensing device 656. Such a device may be operative to serve as part of a cash dispenser device which selectively dispenses sheets such as currency notes from storage. It should be understood that for purposes of this disclosure, a cash dispenser device, is one or more devices that can operate to cause currency stored in the machine to be dispensed from the machine. Other devices may include a recycling device 658. The recycling device may be operative to receive sheets into a storage location and then to selectively dispense sheets therefrom. The recycling device may be of a type shown in U.S. Pat. Nos. 6,302,393 and 6,131,809, the disclosures of which are incorporated herein by reference in their entirety. It should be understood that a recycling device may operate to recycle currency notes and may in some embodiments, a cash dispenser may include the recycler device. Further an example embodiment may include sheet storage devices 660 of the type previously described herein which are operative to selectively store sheets in compartments.

The example automated banking machine 640 includes a deposit accepting device 662. The deposit accepting device of an example embodiment is operative to receive and analyze sheets received from a machine user. The example deposit accepting device is also operative to deliver sheets from the machine to machine users. It should be understood that in other embodiments additional or different deposit accepting devices may be used. For example, a recycling device as well as a note acceptor that receives currency notes are also deposit accepting devices. Further for purposes of this disclosure a deposit accepting device may alternatively be referred to as a sheet processing device.

The example automated banking machine 640 further includes a processor schematically indicated 664. The processor is in operative connection with a data store schematically indicated 666. The processor 664 and data store 666 are operative to execute instructions which control and cause the operation of the automated banking machine 640. It should be understood that although one processor and data store are shown, embodiments of automated banking machines may include a plurality of processors and data stores which operate to control and cause operation of the devices of the machine.

The processor 664 is shown in operative connection with numerous transaction function devices schematically indicated 668. Transaction function devices 668 include devices in the machine that the processor 664 is operative to cause to operate. These transaction function devices 668 may include devices such as a card reader, printer, keypad, deposit accepting device, sheet dispenser, recycler and other devices in or that coupled with the machine. In an example embodiment the processor 664 is also in operative connection with a communication device 670. The communication device 670 is operative to enable the automated banking machine 640 to communicate with one or more remote servers 672, 674 through at least one network 676. It should be understood that the communication device 670 may suitably comprise a plurality of interfaces of types suitable for communication through one or more types of public and/or private networks so as to enable the automated banking machine 640 to communicate with a server 672,674 and to enable machine users to carry out transactions. Of course it should be understood that this automated banking machine 640 is an example and that automated banking machines may have numerous other types of configurations and capabilities.

Figure 2:
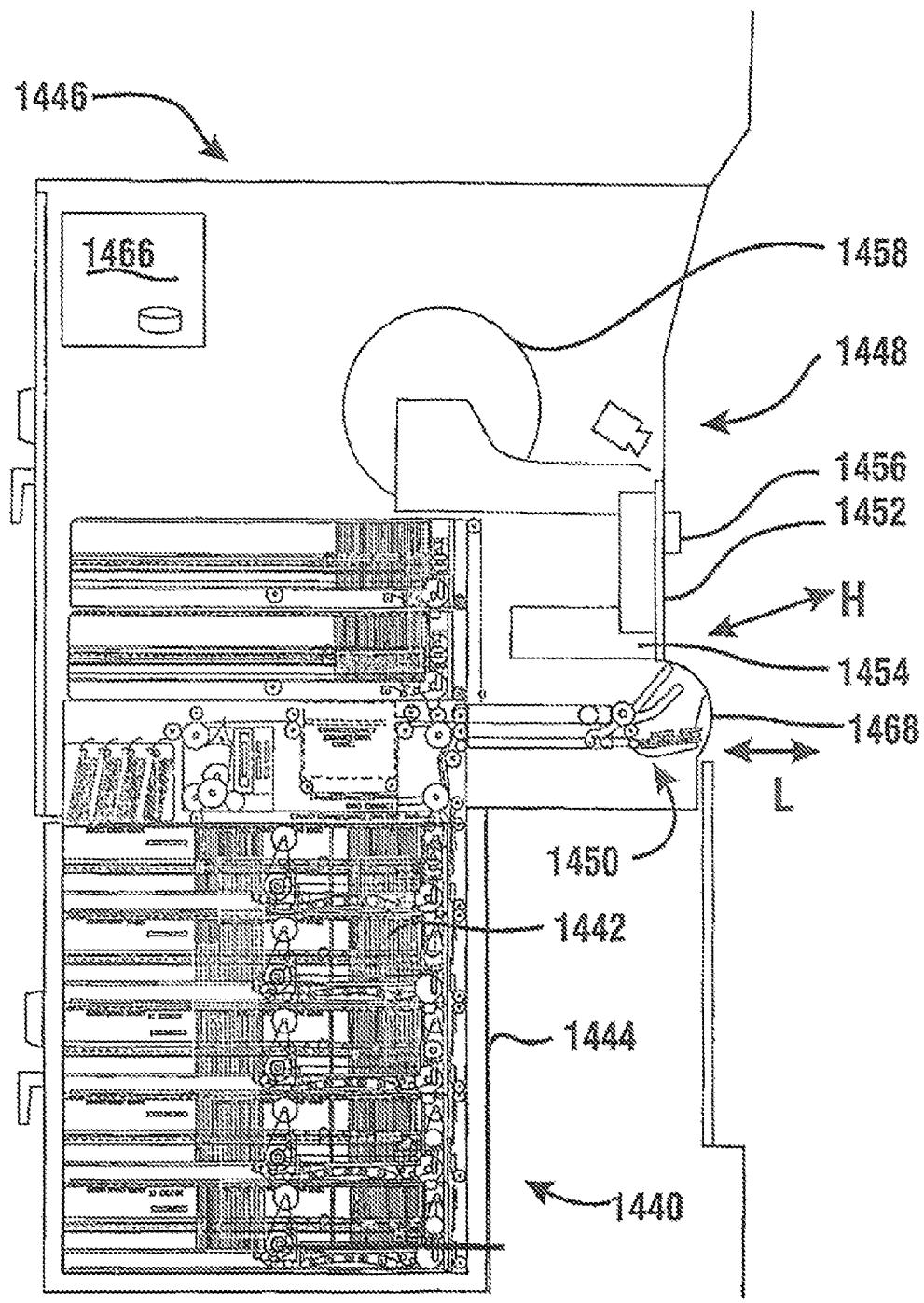
FIG. 2 is a schematic view of an alternative automated banking machine.

FIG. 2 shows an alternative example embodiment of automated banking machine 1440. Automated banking machine 1440 is configured as a through-the wall machine which enables conducting transactions by a user positioned externally of a wall or other area in which the machine is positioned.

Machine 1440 also includes recycling mechanisms 1442 that are positioned within a chest position 1444. An upper housing portion 1446 is in supporting connection with the chest portion. A user interface 1448 is provided for operation by users. The machine includes a sheet handling mechanism 1450 which in an example embodiment may be similar to sheet handling mechanism 1350. The machine further includes a display 1452, a card reader 1454, a keypad 1456 and a receipt printer 1458. The example machine further includes a camera 1460, a 1466, validation devices 1464 and other devices suitable for carrying out transactions.

In an example embodiment, the sheet handling mechanism 1450 includes a selectively movable gate 1468. Gate 1468 is selectively movable by one or more drives of the type previously discussed. In an example embodiment, the sheet handling mechanism is selectively operative to receive and deliver sheets in an angular position that is suitable for the particular user as represented by the arrows H and L. Thus, for example, if the automated banking machine 1440 is positioned adjacent to a drive-through lane, users in high vehicles such as pickup trucks may deliver and receive sheets from the sheet handling mechanism in an upwardly angled direction. Similarly persons in relatively lower vehicles may receive and deliver sheets in a generally horizontal or somewhat downward direction.

In example embodiments, the at least one processor 1466 of the machine may operate in accordance with its programming to evaluate the appropriate position for the sheet handling mechanism to accept and deliver sheets from and to individuals in a vehicle. This may be done, for example, responsive to analyzing images captured through operation of one or more cameras 1460 to determine the relative vertical position of an individual positioned adjacent to the machine in a vehicle. Alternatively, the at least one processor may be operative in accordance with its programming to evaluate locations of various features of the vehicle such as a sill of a door, the top of the roof or other vehicle feature that is indicative of the vehicle height. The at least one processor may then operate in accordance with its programming to adjust the operation of the sheet handling mechanism to the appropriate level.

Alternatively or in addition, the example automated banking machine 1440 may operate using features of the type described in U.S. Pat. No. 8,220,706, the disclosure of which is incorporated herein by reference in its entirety. Such example embodiments of the machine may operate to locate the position of the user's eyes by analyzing images that are captured through one or more cameras 1460. The user's eye position may then be tracked so as to determine the appropriate position for the sheet handling mechanism to receive and deliver sheets. Such features may be used in machines in drive-throughs or in interior units which can more effectively receive and deliver sheets to persons of varying heights and/or in wheelchairs. Alternatively and/or in addition, the machine may also operate in the manner of the incorporated disclosure to receive user inputs through eye tracking analysis and to have such user inputs control one or more aspects of machine operation. Of course these approaches are just examples and in other embodiments other approaches may be used.

Figure 3:
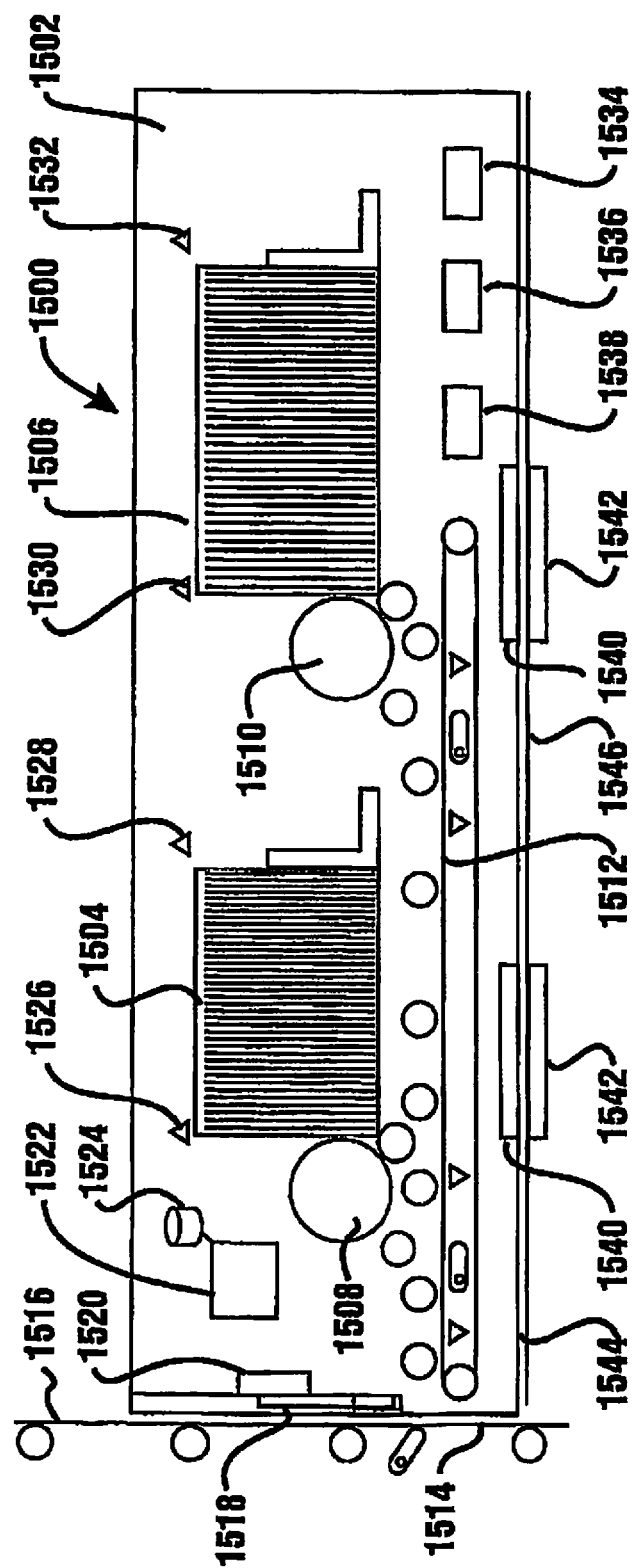
FIG. 3 is a cross-sectional schematic view of a document holding cassette of an example embodiment that is usable in an automated banking machine.

FIG. 3 shows an example embodiment of a cassette 1500 usable in certain embodiments of automated banking machines. It should be understood that for purposes of this disclosure, the terms cassettes and containers are used interchangeably. Automated banking machines may include a plurality of cassettes. In the illustrated example, cassette 1500 is a document holding cassette from which documents may be dispensed and into which documents may be received. Of course, it should be understood that the principles described can be used in connection with cassettes which operate only to dispense documents, as well as cassettes which operate only to receive documents. Cassettes which operate to receive documents may be like those described in U.S. patent application Ser. No. 13/461,258 filed May 1, 2012, the disclosure of which is incorporated herein by reference in its entirety. Of course, numerous different types of cassette mechanisms and structures may be used, depending on the particular type of automated banking machine involved.

The example cassette 1500 includes an interior area 1502 in which documents are stored. In this example cassette, two stacks of documents 1504 and 1506 are shown. These documents may be sheets such as currency bills, checks, vouchers, gift cards, coupons or other items, depending on the nature of the machine and the transactions to be carried out. The example cassette also includes within the interior area two mechanisms 1508 and 1510. These example mechanisms operate to stack sheets in a document stack and to selectively pick sheets from a document stack. In some embodiments, these stacking and picking mechanisms may include features like those shown in U.S. Pat. No. 6,331,000, the disclosure of which is incorporated herein by reference in its entirety. The example mechanisms are operative to selectively remove bills from the associated stack that they can be moved via a transport 1512 to an opening 1514. The documents can be moved from the opening out of the cassette and into engagement with another transport 1516, which can carry the documents to another location within the machine for handling. Likewise, documents carried on transport 1516 can be directed into the opening 1514 and carried by the transport 1512. Documents in engagement with transport 1512 that are incoming to the cassette may be selectively directed to either of the stacker-picker mechanisms 1508 or 1510. Engagement of the sheets with the mechanism operating in the stacking mode will cause the sheet to be stored in aligned relation in the respective document stack. It should be noted that while the example cassette includes two stacking and picking mechanisms, other cassettes may include different numbers of such mechanisms, or mechanisms that receive documents, dispense documents or perform both functions. Some example embodiments may include features disclosed in U.S. Pat. No. 7,891,554, the disclosure of which is incorporated herein by reference in its entirety.

The example cassette 1500 also includes a number of other features and components. A gate 1518 which opens and closes opening 1514 is selectively movable by an actuator 1520 in the cassette. The actuator 1520 operates to move the gate between the open and closed positions. The actuator may be operated to cause the gate to be in the closed position when the cassette is removed from the machine. Closing the gate may secure the cassette so that it can be transported in a manner where it houses documents while minimizing the risk of unauthorized access to and removal of the documents. In an example embodiment, the actuator may include an electro-mechanical actuator, such as a solenoid, a motor, a cylinder, or other driving mechanism that is suitable to impart movement. Further, the example cassette may include other types of actuators, such as motors for moving components of the stacking and picking mechanisms, driving components of the transports, and the like.

The example cassette 1500 further includes at least one processor 1522, which is in operative connection with at least one data store 1524. At least one processor included in the cassette is part of internal cassette circuitry, which is operative to execute computer executable instructions stored in the at least one associated data store. The example at least one processor 1522 also operates to receive and store data. An example embodiment further operates to cause data to be delivered from the cassette in a manner that is hereinafter discussed.

The example cassette 1500 further includes a number of sensors 1526, 1528, 1530 and 1532. These sensors which are shown schematically may be used for a number of different purposes within cassettes of various types. For example, sensors may be used to sense the position of documents within the stacks or documents that move along the transports. Sensors may also be used to detect the positions of gates, picker mechanisms, stacker mechanisms or other structures that are movable within the machine. Sensors may also be used in some embodiments to detect the status of lids, gates, diverters or other items on the cassettes. Other sensors may be used for purposes of detecting motion, cassette orientation or other aspects of the cassette or its components. For purposes hereof, sensors may include optical sensors, magnetic sensors, Hall effect sensors, sonic sensors, thermal sensors, vibratory sensors, proximity sensors, and any other type of sensor that is usable in connection with detecting a particular condition that needs to be detected within the particular cassette.

The example cassette also includes additional features that may be usable in the operation of the cassette or the automated banking machine. For example, these additional features may include a battery 1534. The battery 1534 may in some embodiments be a rechargeable and in others a non-rechargeable battery. The battery may be usable for purposes of powering the cassette circuit, actuators, sensors or other items within the cassette. Other example items may include a document destruction device schematically indicated 1536. The document destruction device 1536 may include a device that is selectively activated to destroy the cassette 1500 and/or documents therein in response to signals given in response to the detection of certain conditions. The document destruction device may include for example, a dye pack, incendiary device or other device suitable to render the documents in the cassette 1500 unusable or destroyed in response to actuation thereof. Such a document destruction device may be actuated in circumstances where it appears that the cassette has been misappropriated or stolen, either with or separate from the automated banking machine.

Other example embodiments may include other features which may be usable in connection with the operation of the machine or the processing of documents. This may include for example, a communication device schematically indicated 1538. The communication device 1538 may in some embodiments include an RF type communication device that can send and/or receive data. Some cassettes with a communication device may communicate with other devices within the machine. Alternatively, or in addition, in other embodiments the communication device may include a cellular modem or other wireless communication device that can communicate separate from the automated banking machine. Such features may be used for purposes of communicating data regarding documents housed within a cassette to the circuitry within an automated banking machine. In other arrangements, the communication device may operate to communicate the whereabouts of the cassette during transport or in operation so that the cassettes and the documents therein can be tracked and accounted for during machine operation, cassette loading and/or transport. Numerous items of data useful in connection with tracking and managing currency bills or other documents may be communicated through operation of communication devices. Of course example cassettes may include other devices as appropriate or useful in connection with their operation.

The example cassette 1500 includes at least one coil schematically indicated 1540. Coil 1540 is in operative connection with the cassette circuit, and in an example embodiment is in operative connection with the processor, data store, sensors and other devices that are in connection with the cassette circuit. Although some example cassettes will have only one such coil and associated circuit, other example cassettes may include multiple coils and circuits therein as is appropriate for the functions carried out by the cassette circuits. In the operative position of the cassette 1500 within the machine, each coil 1540 is in proximity with a machine for primary) coil 1542. Coil 1542 is an electrically energized coil that is associated with at least one driver circuit of the automated banking machine. The energized coil or coils 1542 are operative to create electromagnetic fields that are operative to produce electrical power in the coil or coils 1540 through inductance. In this way, the cassette circuit and devices connected thereto may be electrically powered without the use of wired connectors or similar items that require additional labor to connect and disconnect when cassettes are installed and removed from the machine. Further, in some embodiments, such wireless connectivity may also provide greater reliability by not having wire connectors which can break, separate or otherwise malfunction. In the example arrangement shown, the respective coils associated with the machine and the cassette may be positioned adjacent to one another such that there is a small air gap, which in an example embodiment is in the range of 10 millimeters. The coil or coils 1540 may be positioned adjacent to a bottom surface 1544 of the cassette while the coil or coils 1542 are positioned adjacent to supporting surface 1546, which supports the cassette in the operative position within the interior area of the machine. Of course, this arrangement is example and other coil arrangements and positions may be used.

In an example embodiment, the electrical characteristics which can be produced in the coils are also used for communication between circuits in the machine and the cassette. This is done in the manner hereinafter described so as to enable the machine to communicate instructions and/or data to the cassette 1500, and the cassette 1500 to communicate data and/or instructions to the machine. In an example embodiment, a driver circuit associated with the coil 1542 or cons in the machine operates to selectively vary the magnetic intensity produced by the coil in ways that can be detected as changes in the electrical properties of the coil or cons in the cassette. These variations can be interpreted as binary data which corresponds to transmitted information which can be detected and utilized by the cassette circuit. Further in an example embodiment, the cassette circuit operates responsive to the processor to vary a resonant frequency of the coil or cons 1540 associated with the cassette. This variation of the resonant frequency is detectable through operation of the associated machine coils 1542 so that data in a binary form can be received and utilized in operation of the machine.

Figure 4:
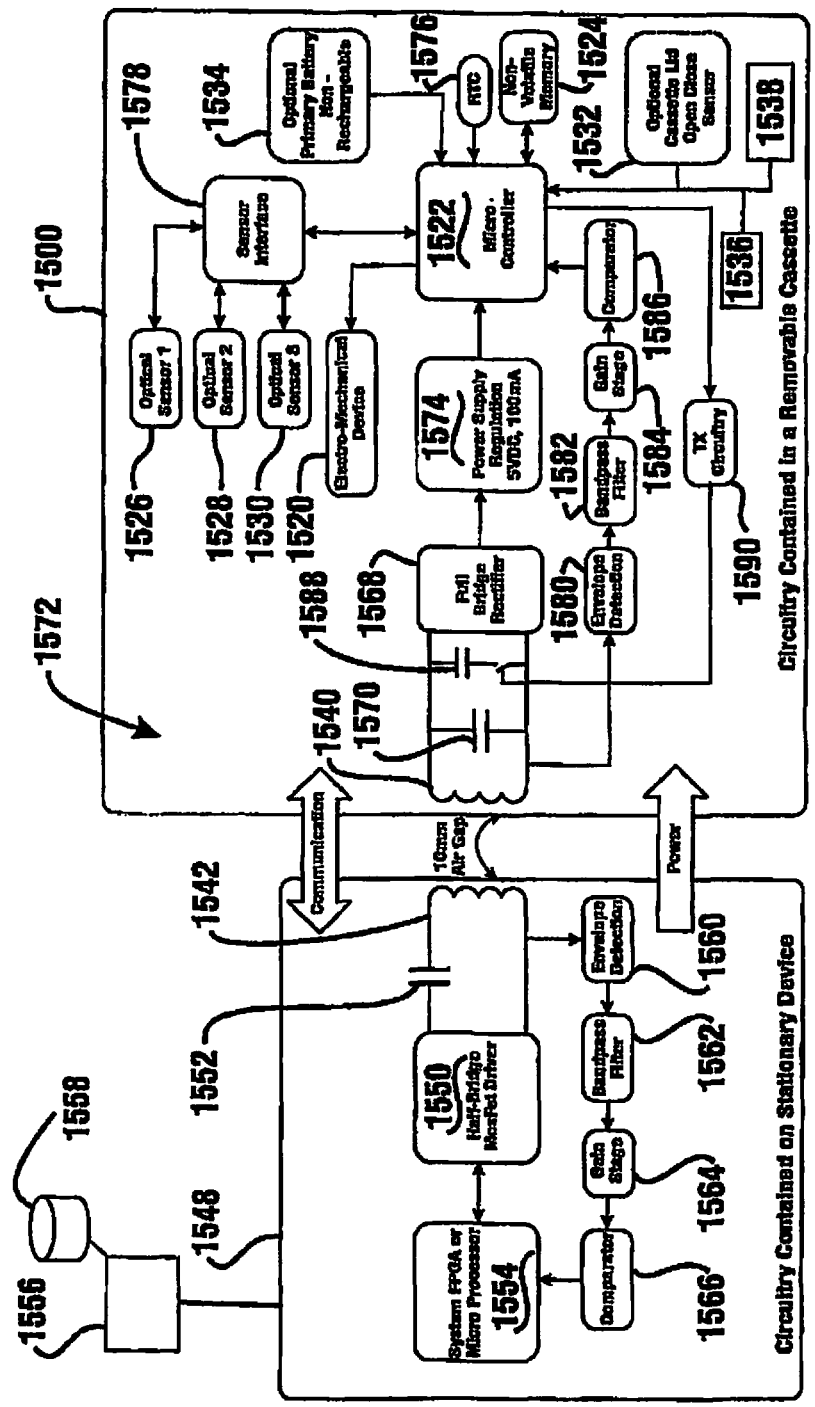
FIG. 4 is a schematic view of circuitry associated with an example document cassette that includes circuitry that is inductively powered.

FIG. 4 shows schematically the circuitry used in connection with the cassette and the automated banking machine of an example embodiment. A driver circuit 1548 is operative to supply power to coil 1542. The driver circuit includes a haft-bridge MOSFET driver 1550 that is in series with a capacitor 1552. The series combination of the capacitor 1552 and the coil 1542 have a resonant frequency. The driver circuit further includes a field programmable gate array (FPGA) and/or a processor 1554. The FPGA or processor is in operative connection with the MOSFET driver 1550. In an example embodiment, the FPGA or processor 1554 is in operative connection with one or more other processors 1556 that are associated with the machine. One or more processors 1556 are associated with one or more data stores 1558. In some embodiments, the processor 1556 may be the automated banking machine terminal processor that is operative to cause operation of other devices within the machine. Such devices may include for example, a card reader, a display, a cash dispenser, a cash recycler, a check acceptor and/or other actuators or devices associated with the machine. Alternatively, in some embodiments, the processor 1556 may be associated with certain sub-circuitry associated with the particular driver circuit for the cassette. Various approaches may be used in connection with different arrangements.

In an example embodiment, the FPGA or processor 1554 is operative to output a square wave pulse signal. The square wave pulse signal is fed to the MOSFET driver 1558 to create a frequency that is relatively close to the series resonant frequency associated with the capacitor and the coil combination. In example embodiments, the frequency chosen is near the resonant frequency, but is disposed above or below the resonance value. This is done in an example embodiment because at resonance high voltages or currents can be produced, which are more difficult to control. However, as can be appreciated, operating at resonance may be desirable in some alternative embodiments where maximum power transfer is desired, as opposed to control for purposes of communication or other functions.

In an example embodiment of the driver circuit, components are provided for monitoring electrical properties in the primary coil. These components provide feedback to the FPGA or processor which provides the square wave signal that drives the MOSFET driver. In an example embodiment, these components which provide feedback include a signal envelope detection component 1560, a band pass filter 1562, a signal gain stage 1564, and a comparator 1566. Through monitoring of the electrical signal properties associated with the coil 1542, and feeding this information back to the FPGA or processor 1554 driving the capacitor and coil combination, effective power transfer and communication is achieved in an example embodiment in the manner hereinafter described.

The coil 1540 within the cassette magnetically couples to the coil 1542 when the cassette is placed in its operative position within the machine. This magnetic coupling of the coils causes electrical power to be inductively produced in a secondary coil 1540. Due to the square wave signal which is used to electrically power coil 1542, the induced voltage in coil 1540 is an AC voltage. This AC voltage is fed through a full-bridge rectifier 1568 and a filter capacitor 1570. DC voltage that is produced is fed to other components in the cassette circuit generally indicated 1572, which include components which have been previously discussed. In addition, the example cassette circuit 1572 includes a power supply regulator 1574, a real time dock 1576, sensor and device interfaces schematically indicated 1578. Of course, this may also include other components and appropriate interfaces, depending on the particular devices included in the cassette circuit.

The parallel connection between the coil 1540 and the capacitor 1570 produces a circuit having a parallel resonance. The component values for the coil and the parallel capacitor of the cassette are chosen so that the parallel resonance frequency closely matches the series resonant frequency of the driver circuit. As the driver circuit 1548 operates close to the series resonant frequency of the driver circuit, this enables efficient power transfer between the coils 1542 and 1540. As previously mentioned, in this example embodiment the driver circuit does not operate at the resonant frequency, but rather a frequency near, but disposed from resonance to avoid excessive high voltage and currents. However, in other embodiments, resonant frequency operation may be desirable to achieve maximum power transfer.

The cassette circuit 1572 of an example embodiment further includes components used for monitoring the electrical properties within the circuitry, including the coil 1540. These components are similar to those discussed in connection with the driver circuit. They include an envelope detection component 1580 and a band pass filter 1582. The components further include a gain stage 1584 and a comparator 1586. These components enable monitoring of the electrical properties by the processor of the cassette circuit for purposes of achieving power transfer and also communication.

In an example embodiment, two-way communication is achieved between the cassette and the driver circuit 1548 in a wireless manner. This is done by controlling variation of the electrical properties in the respective coils 1540 and 1542. This facilitates communication of data to and from the cassette and the machine without the need for additional electrical connectors or components. Of course, it should be understood that in some embodiments, additional means for wired or wireless communication between the cassette and components of the automated banking machine or other systems may be provided.

In an example embodiment, communication of data transmitted from the machine to the cassette is achieved by changing the magnetic field intensity produced in the coil 1542, which can be sensed by the coil 1540 and the cassette circuit as a change in voltage amplitude. This is done, in this example, by varying the square wave pulse signal that controls the half bridge MOSFET driver between two different frequencies. The change in voltage amplitude that is produced by varying the signal between the two frequencies produces logic level 0s and 1s to achieve a binary representation of the data that is to be communicated from the driver circuit to the cassette. The variation corresponding to the transmitted data may be controlled by the one or more processors 1556, which are in communication with the FPGA or processor 1554 through appropriate circuitry. The processor and/or associated circuitry may cause a variation in frequency so as to generate the binary data which is transmitted to the cassette. The cassette is operative to sense the variations in the magnetic field intensity of the coil 1542. These changes cause a change in voltage amplitude in the coil 1540 of the cassette. These changes in voltage amplitude are detectable via the circuitry that operates to monitor the electrical properties in the circuit that includes the coil. These changes are interpreted through operation of the processor 1522. The transmitted data is then utilized through operation of the processor to provide appropriate programming or perform programmed functions. Such transmitted data may also cause changes in the operation of the cassette. Such transmitted data may also cause the cassette to deliver data stored in the cassette as transmitted data to the driver circuitry to facilitate operation of the machine.

Data which is transmitted to the cassette in some embodiments may include information regarding document types included in the cassette, document quantities, document properties, ownership of documents, entities responsible for document handling, information regarding cassette properties or cassette operations, and program instructions for the operation of actuators, sensors or other devices that are included in the cassette. Of course, these transmitted data items are example, and in other embodiments other items may be used. Further, these transmitted items may include for example, data associated with secure communication between the machine and the cassette, as well as data usable in connection with encryption of transmitted data as later discussed.

In an example embodiment, the cassette is also operative to communicate transmitted data to the driver circuit 1548. Data transmitted therethrough may be received by one or more processors or other devices of the automated banking machine. In an example embodiment, this is achieved using an amplitude shift keying method. In the illustrated example, cassette processor 1522 operates to selectively switch a capacitive load 1588 in and out of the parallel arrangement of the coil 1540 and capacitor 1570. The capacitive load is switched in and out responsive to operation of the processor 1522 via a switching component 1590. When the processor 1522 operates to cause the capacitive load 1588 to be switched on, the resonant frequency of the coil and the cassette circuitry is changed. This change is sensed in the electrical properties of the coil 1542 as a change in voltage amplitude. These changes in voltage amplitude correspond to 0s and 1s, which correspond to a binary representation of the transmitted data that is sent from the cassette. This transmitted data from the cassette is transmitted in an example embodiment to the at least one processor 1556, where it can be utilized in the operation, control, and record keeping of the automated banking machine.

In particular embodiments, data transmitted from the cassette include data such as document type, document quantity, document properties, time values, cassette identifiers, cassette properties, cassette age information, cassette cycle information, cassette ownership data, cassette history or other information. It should be appreciated that these items are example, and in other embodiments other types of data may be communicated. Further, in some embodiments, additional data associated with authentication and encryption of transmitted data may be included.

It should be appreciated that while in the illustrated example embodiment data transmission and communication is associated with a single pair of coils, in other embodiments multiple coil arrangements may be used. These may include multiple driving circuits and cassette circuits. In addition, while power transmission and communication is achieved by common cons in the example circuitry, in other embodiments certain coil pairs may be used for communication while others are used for power transmission. In some embodiments, inductive powering of cassette circuitry may be accomplished by operating some circuits for maximum power transmission at a resonant frequency to achieve maximum power transfer, while others are used for communication and are operated at one or more frequencies that are disposed from the resonant frequency. Of course, the approach taken will depend on the particular circuitry and power requirements associated with the particular cassette. In addition, it should be appreciated that while an example embodiment has been described in connection with providing power in a wireless manner to a cassette within an automated banking machine, these same principles may be applied to other types of devices and components. These may include other types of devices within an automated banking machine that require electrical power for their operation. These may include numerous different types of devices that may otherwise require a powered connection via wires so they operate in the machine. In addition, other types of devices used in different applications may also utilize aspects of the described features.

In an example embodiment, the driver circuitry 1548 also operates to detect when the cassette 1500 and the associated cons 1540, 1542 thereof have been placed in the operative position. Likewise, the driver circuit 1548 may operate to determine when the cassette 1500 has been removed from the operative position. This is done by monitoring of the electrical properties in the circuit, including the coil 1540. For example, if cassette 1500 is removed from its adjacent operative position with respect to the coil 1542, then removal of the inductive load will be sensed through operation of the driver circuit 1548. In response to detection of this condition, one or more messages may be sent to the processor 1556. The processor 1556 may operate in accordance with its programming to take appropriate steps. Such steps may include for example, determining if the housing, including the cassette, has been opened by an authorized servicer. This may also include determining whether the machine has been placed into a service mode that would be appropriate for the removal of cassettes. Further, in some embodiments, the at least one processor 1556 may operate to give notifications or alarms in cases where the cassette has been removed from its operative position under circumstances that are not consistent with what is permissible in accordance with the programmed instructions associated with the processor 1556.

Also, the driver circuit 1548 of an example embodiment is operative to detect when the cassette 1500 is moved into the operative position such that coil 1540 is adjacent to coil 1542. The placing of the coils 1540, 1542 into proximity of each other causes inductive loading of the driver circuit 1548, which is detected through the operation thereof. The placement of the cassette 1500 into the operative position may in some embodiments cause the processor 1556 to transmit data to the cassette 1500. Transmission of the data may cause operation of certain functions of the cassette 1500, such as the opening of the gate or the positioning of other components so that the cassette may operate within the automated banking machine. Alternatively or in addition, the transmitted data to the cassette may operate to cause the cassette to provide information necessary for the use of the cassette for the documents contained therein) by the machine. Of course, these approaches are example and in other embodiments other approaches may be used.

In additional embodiments, secure communication may be provided between the cassette and the automated banking machine. This may be desirable for example, so that the gates which control access to the cassette interior, the opening of cassette access doors, or other items can only be accomplished under circumstances that have been authorized. Data may be transmitted in an encrypted manner in accordance with a scheme that has been established by the manufacturer of the machine and the cassettes. Further, in some embodiments, public-private key encryption and authentication may be utilized to assure that the cassette only operates in response to signals from a source that is authenticated as appropriate for operation of the cassette. This might involve for example, each of the driver circuit and the cassette having respective public-private key pairs. These public-private key pairs are stored in memory. The public-private key pairs may be configured so that data encrypted with the public key of the key pair can only be decrypted using the private key of that pair and vice versa. In some example arrangements, the cassette and driver circuitry, when placed in operative connection or at other times, may exchange their respective public keys. Through the exchange of the public keys, each component may send appropriately encrypted data that can be decrypted by the other component. Such data may include data that can be used to authenticate the other component as genuine and/or authorized to operate in connection with the other component. This may include for example, digital certificates or other values which can be authenticated as appropriate to allow inter-operation. Of course the approaches are example, and in other embodiments other approaches may be used.

Further, in example arrangements, the cassette circuitry 1572 may operate to perform functions that provide enhanced security for the cassette and the documents that may be included therein. For example, in some embodiments one or more processors 1522 may operate in accordance with their programming to detect the removal of a cassette 1500 from operative engagement with the associated coil or coils of the machine. In response to sensing this condition, the at least one processor 1522 in the cassette circuit may cause the gate 1518 or other access openings in the cassette to close and lock. This may be done for example, through operation of the battery 1534 or other power source that remains available in the cassette when the cassette is disconnected from the inductive power supplied in the operative position. Further, the at least one processor 1522 may operate in accordance with its programming to take other steps to assure cassette security. This may include for example, arming a dye pack or incendiary device 1536 that would destroy the contents of the cassette if an attempt is made to open the cassette using unauthorized methods. Alternatively or in addition, signals may be provided indicating the location of the cassette to a remote monitoring center or other location as appropriate by the cassette communication device 1538. Further, conditions related to the cassette may be transmitted wirelessly so that the location and/or condition of the cassette may be monitored from a remote monitoring center. This may be done in some embodiments only at times when particular conditions are detected. However, in other embodiments such monitoring may be carried out at most times. Further, the capability of some example cassettes to have remote communications with a monitoring center may enable the monitoring center to destroy the cassette contents or otherwise take steps related to securing the cassette as appropriate in particular circumstances.

As can be appreciated, in some embodiments, cassettes may be configured so as to only enable cassette access and opening of the cassette under circumstances of a known secure environment. This may include installation of the cassette in authorized machines that can bad and unload documents from cassettes. Such machines may include test fixtures or loading stations or other devices as are appropriate for loading, unloading or repairing the particular types of cassettes. Further, cassettes may include additional features that prevent use in certain ways or by unauthorized persons. These may include for example, including in cassettes appropriate circuitry that can detect counterfeit documents such as counterfeit bills or other items that might be attempted to be passed to the machine or dispensed by criminals. Such detection circuitry may monitor properties of bills, checks or other documents for indicia which can be sensed for evidence of genuineness or counterfeit status. Further, example embodiments may also include provisions for storing data to identify particular individuals or transactions that have operated to include particular documents within a given cassette. This may enable data to be restored and recovered regarding particular times, individuals, transactions or circumstances that have caused counterfeit or suspect documents to be included in cassettes. Of course, these approaches are example and in other embodiments other approaches may be used.

In example embodiments, the automated banking machine and/or cassette may include media which has computer executable instructions which can be executed through operation of processors to carry out the various functions of the automated banking machine and/or the cassette. Such example computer readable media may include random access memory, read only memory, programmable read only memory, magnetic media, optical storage media, semiconductor media, flash storage media or any other type of media that may include stored data which corresponds to computer executable instructions.

Figure 5:
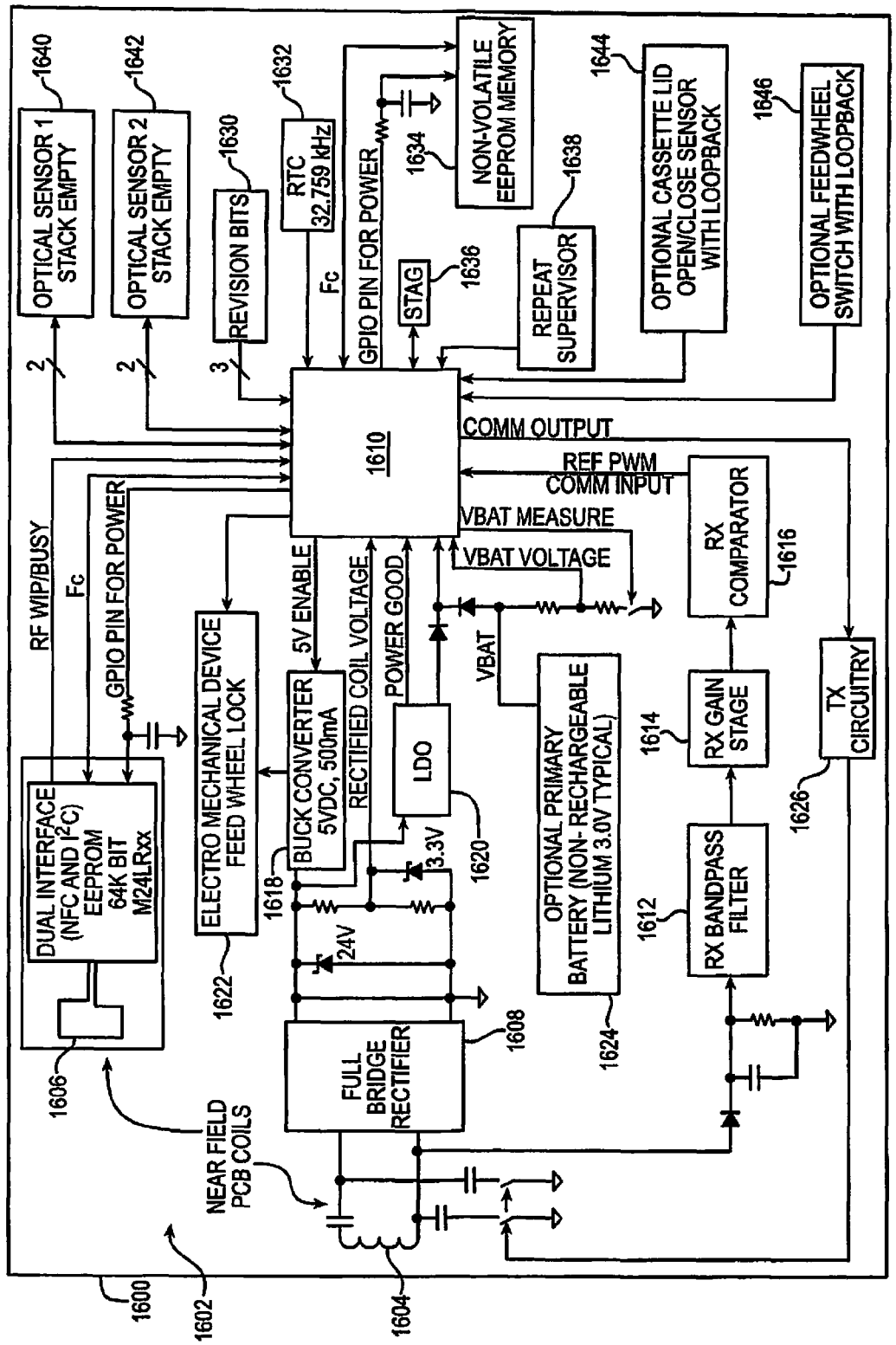
FIG. 5 shows an example circuit arrangement for a container, such as a removable cassette for an automated banking machine.

Additional example embodiments also allow for power and data communication to be wirelessly provided to a cassette. FIG. 5 shows a powered circuit 1602 for a cassette 1600. Although differently configured, the circuit 1602 can function (operate) in a manner similar to the previously discussed circuit 1572 in the cassette 1500 of FIG. 4. That is, circuit 1602 and circuit 1572 can be used for the same purpose, to perform a similar function. Again, the cassettes 1500, 1600 can be used to dispense or receive various types of media, such as cash, checks, gift cards, stamps, gaming (lottery) tickets, coupons, documents, etc. For example, cassettes 1500, 1600 can be employed for the sheet dispensing device 656 (FIG. 1), recycling device 658 (FIG. 1), and/or recycling mechanism 1442 (FIG. 2). A component, such as a cassette holder of an automated banking machine (e.g., an ATM), can be equipped with one or more of these media cassettes. The cassette 1600 can receive power and communication via a wired connection with the machine component (e.g., a cash dispenser module). Alternatively, a cassette can wirelessly receive such power and communication from the machine component.

In the additional example embodiments, a magnetic field coupling is also used to inductively transfer power and communication data wirelessly from a module (e.g., a cash dispenser or a cash recycler) to a circuit board installed in the media cassette. A coil of the media cassette can magnetically couple with another coil of the module. Again, for reasons of brevity, the module (or machine) coil (e.g., coil 1542 in FIGS. 3 and 4) may be referred to herein as the primary coil, with the cassette coil 1604 (that is similar to coil 1540 in FIGS. 3 and 4) referred to as a secondary coil. It should also be understood that both a primary coil and a secondary coil 1604 may each comprise one or more (plural) separate coils. In the additional example embodiments, the primary coil can be fed by a half bridge MOSFET driver and be placed in series with a capacitor. The series combination of the capacitor and the primary coil can produce a resonant frequency which allows for an increased power coupling between the two coils.

The current through the series circuit can be monitored to ensure the product is operating within a specified range. For instance, excessive current consumption can be realized when an unintentional conductor is placed near the primary coil, causing eddy currents to flow in the conductor. The eddy currents may oppose the primary coil's magnetic field and in turn cause a larger current consumption in the primary coil.

A square wave pulse sourced by either a microprocessor or FPGA can be fed into the half bridge MOSFET driver to create a frequency which is relatively close to the series resonant frequency of the capacitor and primary coil. As previously discussed, operation may be chosen either (slightly) above or below resonance, instead of at resonance. Such operation can prevent high voltages and currents that may occur at resonance.

The primary and secondary coils can be manufactured directly on a PCB (Printed Circuit Board) using etched copper traces rather than implementing a discretely wound coil. The arrangement can reduce the physical space required to mount the coils, maintain a lower overall cost for the finished assemblies, and allow the tolerance of the coil to be tightly controlled by PCB manufacturing methods. A ferrite material can be bonded to the backside of the PCB coil to aid in the shielding or shunting of the magnetic field produced by the PCB coils, and also to increase the coupling factor between the primary and secondary coils.

The secondary (cassette) coil 1604 can be magnetically coupled to the primary (module) coil to produce an induced voltage on the secondary coil. This AC voltage can be fed through a full bridge rectifier and a filter capacitor. Thus, a DC voltage can be produced which can be used by other downstream electronic circuitry in the cassette. The secondary coil 1604 can be placed in series with a capacitor to form a series resonant circuit. The component values for the secondary coil 1604 and the series capacitor can be chosen so that the series resonance closely matches that of the primary's series resonant frequency. As previously discussed, this configuration can allow for a more efficient power transfer between the primary and secondary coils.

The DC voltage produced from the secondary coil 1604 can then be delivered to a set of voltage regulators (e.g., rectifier 1608, buck converter 1618, and low-dropout regulator (LDO) 1620), which can convert the incoming voltage to a specific level for downstream electronics. A microprocessor 1610, non-volatile memory, switches, an electromechanical device, and optical sensors can all be powered by voltage from the voltage regulators. The DC voltage produced from the secondary coil 1604 can also be monitored by a microprocessor to insure that it remains within a predetermined range. For example, the monitoring can be accomplished by communicating the voltage level feedback through the primary coil's circuitry (located on the module). The module can be equipped with the ability to adjust the operating frequency of the primary coil to either increase or decrease the secondary's coils DC voltage.

Communication from the primary coil to the secondary coil can be achieved by using an amplitude shift keying (ASK) method. The square wave pulse which controls the half bridge MOSFET driver can be varied between two different frequencies. The two different frequencies can produce a change in the primary coil's magnetic field intensity. The change can be sensed by the secondary coil as a change in voltage amplitude. This change in voltage amplitude can be used to define (binary) logic level "O's" and "1's" (bits) for communication of data. For example, various media cassette metrics data (e.g., dispensed counts) can be transmitted from the module to the cassette's non-volatile memory for permanent storage thereof.

Secondary coil to primary coil communication can occur in a manner similar to the (opposite direction) primary coil to secondary coil communication. That is, communication from the secondary coil to the primary coil can also be achieved through use of an amplitude shift keying method. Different than the primary coil side, a capacitive load can be switched in and out of the series combination of the secondary coil and the capacitor. When the capacitive load is switched on, then the resonant frequency can be changed. This change can be sensed by the primary coil as a change in voltage amplitude. This change in voltage amplitude can similarly be used to define (binary) logic level "O's" and "1's" (bits) for communicating data.

An example arrangement enables the module to detect the presence of a media cassette that has been placed (installed) in or on the module (e.g., a cash dispenser). Upon detection the module can begin communicating with the cassette. As previously discussed, the arrangement of the set of coils allows bi-directional or two-way communication to be carried out between the module and an installed cassette.

Along with bi-directional communication, the example arrangement also allows for ample power to be transferred over the same set of coils. Such wireless transfer of power can enable the operation of an electromechanical device (e.g., a solenoid) and several optical sensors. Thus, power can be communicated without the use of wires or a physical connection. The module can act as a power drive for the (driven) cassette components. A circuit card of the media cassette can include a PCB antenna. The antenna can be used to interact with a Smartphone or similar smart device. The wireless interaction can be via an industry standard, such as RFID or near field communication (NFC) protocol. The cassette can include a shared memory device, which allows for data exchange from an NFC device to the cassette's internal microprocessor.

The ability to use a smart device to wirelessly exchange data to and/or from a cassette provides a convenient communication channel for machine service technicians (e.g., cash handlers), which can help streamline their daily functions and tasks. For example, an accessible cassette not currently installed in a module can have data read from (or loaded into) the cassette by using a Smartphone or NFC compliant device. The arrangement allows for alternative methods of tracking cassette data. Security features can also be implemented which would prevent unauthorized personnel from reading or writing information (data) to a cassette. An optional (primary) battery can be used in the media cassette to power (drive) the internal microprocessor. The battery can be rechargeable or non-rechargeable. For example, when the cassette is installed in a module then power can be transferred through the coils to charge the battery.

When the media cassette is not in the module then battery power can be relied on to enable the cassette to operate various components thereof (e.g., sensors, microprocessors, etc.). For example, the cassette will have the ability to track various asynchronous events, such as the status of its cassette lid. Whenever the cassette lid is opened and closed, then data corresponding to these sensed events can be stored in the cassette's non-volatile memory. Furthermore, the cassette can include a sensor which monitors rotation of a feed wheel mechanism in the cassette. The sensor can be used to detect a tamper event involving the cassette. For example, the feed wheel can be arranged so that it should not turn when the cassette is not installed in a module. If the cassette is uninstalled and a sensor indicates that the feed wheel can be turned, then this situation can be recorded as an incident of (unauthorized) tampering involving the cassette. Thus, battery power allows incidences of cassette tampering to be detected, tracked, and stored in non-volatile memory for post processing. The battery's voltage level can be monitored by the microprocessor in the cassette. Historical data corresponding to the voltage level can also be recorded in memory by the microprocessor. The voltage level data can be retrieved and reviewed, such as by a cassette service handler. Thus, the cassette arrangement allows for an early indication (notice or prediction) of low battery power prior to failure of the battery. Preventive maintenance on the battery (and the cassette) can be scheduled using such (sensed) features.

As previously noted, FIG. 5 shows an example embodiment of circuit electronics for a removable cassette 1600. As can be seen, the cassette circuit 1602 can include near field PCB coils 1604 and 1606. The coil 1604 can be placed in proximity with a (drive) coil of a module (e.g., a cash dispenser module), as previously discussed. The coil 1606 can have a dual interface, such as NFC and I2C. Various capacitors, resistors, diodes, and other elements are also shown.

The example embodiment shown in FIG. 5 further includes a processor 1610, fullbridge rectifier 1608, a band pass filter 1612, a signal gain stage 1614, and a comparator 1616. The processor 1610 can be an ultra-low-power mixed signal device. A 16-bit RISC CPU and 16-bit registers can be used. For example, the processor 1610 can comprise a MSP430(F5308) microcontroller platform from Texas Instruments.

Also included in this example is a buck converter 1618, a low-dropout regulator (LDO) 1620, an electromechanical device 1622 (e.g., a cassette feed wheel lock), an optional primary battery 1624 (e.g., lithium 3.0V), and additional circuitry 1626. The buck converter (e.g., 5 VDC, 500 mA, but those skilled in the art can readily appreciate any suitable voltage, amperage cam be used) can be used to reduce the voltage of a DC supply. The LDO (e.g., 3.3V, 50 mA, but those skilled in the art can readily appreciate any suitable voltage, amperage cam be used) can be used as a DC linear voltage regulator.

Also shown are revision bits 1630, a real-time clock (RTC) 1632, non-volatile memory 1634 (e.g., a data store; such as AT24C1024B), a Joint Test Action Group (JTAG) 1636, and a reset supervisor 1638.

Further shown are a first optical sensor 1640, a second optical sensor 1642, an optional cassette lid sensor 1644, and an optional feed wheel switch 1646. The first optical sensor 1640 can be used to detect thumper pick position. The second optical sensor 1642 can be used to detect an empty stack. The lid sensor 1644 can function as an open/close sensor with a loop back for presence detection. The feed wheel switch 1646 can also be arranged with a loopback for presence detection.

The embodiment shown in FIG. 5 can have a battery power budget, for example, that comprises the features of a MSP430 microcontroller platform (e.g., 3 pA low power mode 3, crystal); 12C EEPROM (0 μA; powered by a MSP GPIO pin); phototransistor leakage (2×100 nA); reset supervisor (0.6 μA, max). Thus, the total can equal 3.8 μA. A requirement may be set that is less than 8 μA for a life of 10+ years using a 1000 mAh primary battery. It should be understood that the embodiment shown in FIG. 5 is merely an example, and that the present disclosure includes other embodiments that have other cassette circuit configurations.

Figure 6:
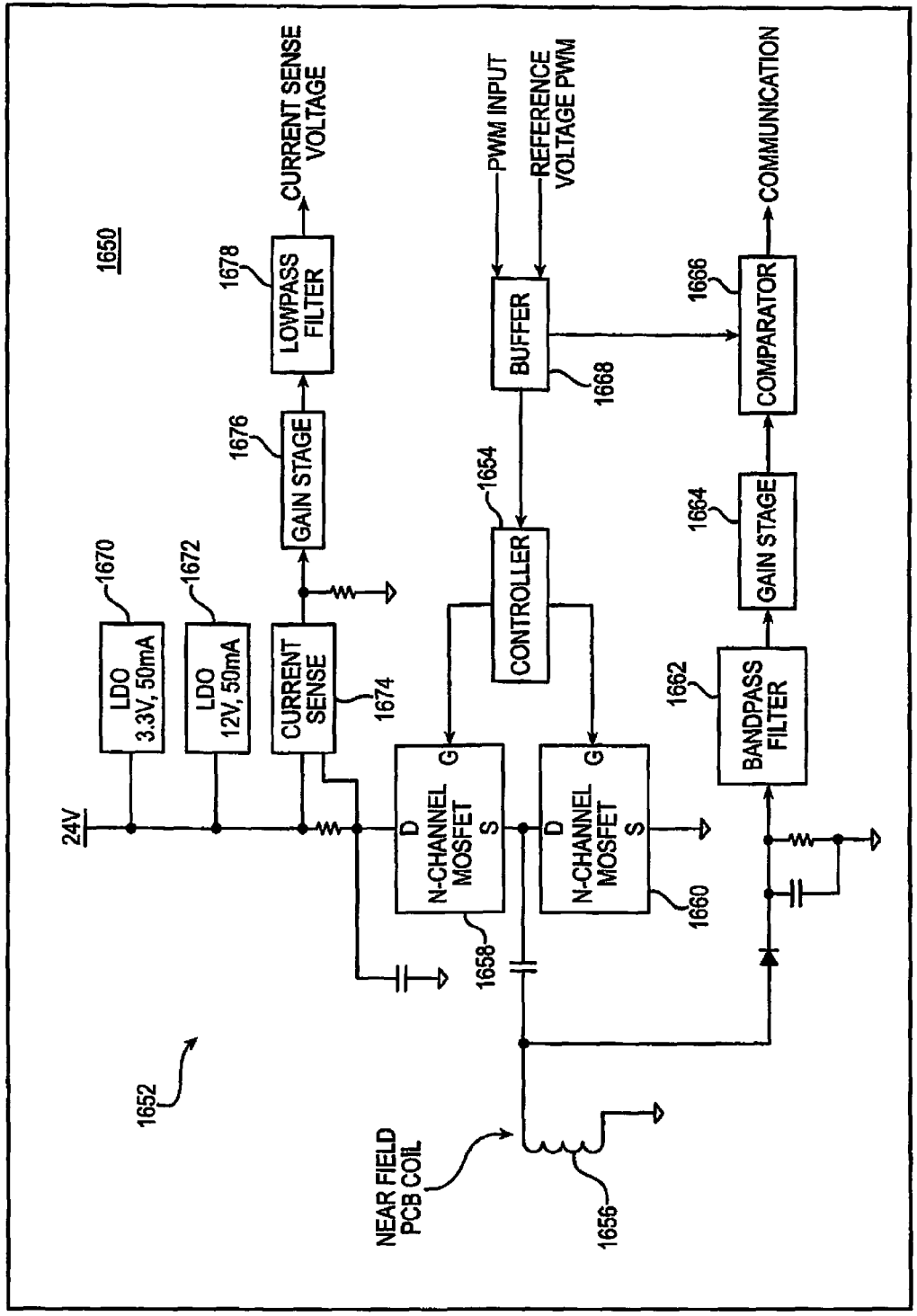
FIG. 6 shows an example circuit arrangement for a transmitter, such as a transmitter in a module of an automated banking machine.

FIG. 6 shows an additional example embodiment of circuit electronics for a transmitter. The transmitter can be a part of a machine, a device, or a component, such as a module 1650. As previously discussed, an automated banking machine can have several different types of modules, including a cash dispenser module, a cash acceptor module, a cash recycler module, and/or other types of modules that can receive a removable cassette. Although differently configured, the circuit 1652 shown in FIG. 6 can function (operate) in a manner similar to the previously discussed circuit 1548 in FIG. 4. That is, circuit 1652 and circuit 1548 can be used for the same purpose, to perform a similar function.

As can be seen from FIG. 6, the circuit 1652 can include a controller 1654 (e.g., LM5106 PWM), a coil 1656 (e.g., near field PCB coil), a first N-channel MOSFET 1658, a second N-channel MOSFET 1660, a band pass filter 1662, a gain stage 1664, a comparator 1666 (e.g., LMV7271), a buffer 1668 (e.g., 74LVC2T45), a first LDO 1670 (e.g., LM317, 3.3V, 50 mA), a second LDO 1672 (e.g., LM317, 12V, 50 mA), a current sensor 1674 (e.g., AD8212), another gain stage 1676, and a lowpass filter 1678.

As previously discussed, data can be wirelessly communicated (transmitted) from the module to a cassette (having a receiving coil) by changing the magnetic field intensity produced in the coil. Thus, the module coil 1656 when energized can also function as a drive coil that is able to create electromagnetic fields that produce through inductance, electrical power in the adjacent magnetically coupled (receiving) coil of the cassette. That is, the magnetic coupling of the adjacent coils can cause electrical power to be inductively generated in the power receiving coil of the cassette. It should be understood that the embodiment shown in FIG. 6 is example, and that the inventive scope includes other embodiments that have other transmitter circuit configurations.

Furthermore, in some further embodiments a cassette can be equipped with a transmitter having a circuit similar to the circuit arrangement shown in FIG. 6. The cassette transmitter can be used to communicate data to a module or some other component device, such as in a manner previously discussed.

The term "non-transitory" with regard to computer readable medium is intended to exclude only the subject matter of a transitory signal per se, where the medium itself is transitory. The term "non-transitory" is not intended to exclude any other form of computer readable media, including media comprising data that is only temporarily stored or stored in a transitory fashion. Should the law change to allow computer readable medium itself to be transitory, then this exclusion is no longer valid or binding.

Described above are example embodiments. It is, of course, not possible to describe every conceivable combination of components or methodologies, but one of ordinary skill in the art will recognize that many further combinations and permutations of an example embodiments are possible. Accordingly, this application is intended to embrace all such alterations, modifications and variations that fall within the spirit and scope of the appended claims interpreted in accordance with the breadth to which they are fairly, legally and equitably entitled.

What is claimed:

1. An apparatus, comprising:
   a currency cassette that is removably positionable from an operating position within an automated banking machine;
   wherein the currency cassette is configured to hold a plurality of currency notes;
   the currency cassette comprises:
      an internal electrical power circuit that comprises a first coil, a power supply coupled with the first coil, and a controller coupled with the power supply and the first coil; and
      a second coil operably coupled with a communication device that is coupled with the controller;
   wherein the power supply is operable to receive power via magnetic coupling of the first coil with the automated banking machine;
   wherein the controller is operable to receive power from the power supply;
   wherein the controller is operable to receive data via magnetic coupling of the first coil with the automated banking machine;
   wherein the second coil is operable to wirelessly communicate with a second, external device, the controller is operable to exchange data with the second external device via the second coil; and
   wherein the controller is operable to send data to the automated banking machine by changing magnetic field of the first coil.

2. The apparatus set forth claim 1, wherein the communication device comprises a near field communication (NFC) device.

3. The apparatus set forth in claim 2, wherein the communication device comprises an I2C device.

4. The apparatus set forth in claim 1, wherein the communication device comprises a dual interface NFC and I2C device.

5. The apparatus set forth in claim 4, further comprising a battery, wherein power is supplied by the battery to the controller and the communication device while the cassette is not in the operating position.

6. The apparatus set forth in claim 4, wherein the controller comprises a non-volatile memory that is shared with the communication device.

7. The apparatus set forth in claim 6, further comprising a cassette lid;
   a sensor to detect the status of a cassette lid coupled with the controller; and
   wherein the controller is operable to store a change in the status of the cassette lid in the non-volatile memory.

8. The apparatus set forth in claim 7, further comprising:
   a sensor which monitors rotation of a feed wheel mechanism in the cassette coupled with the controller;
   wherein the feed wheel is arranged to not turn when the cassette is not in the operating position; and
   wherein the controller is operable to record as an incident the feed wheel turning when the cassette is not in the operating position.

9. The apparatus set forth in claim 6, further comprising:
   a sensor which monitors rotation of a feed wheel mechanism in the cassette coupled with the controller;
   wherein the feed wheel is arranged to not turn when the cassette is not in the operating position; and
   wherein the controller is operable to record as an incident the feed wheel turning when the cassette is not in the operating position.

10. The apparatus set forth in claim 1, wherein the controller comprises a non-volatile memory that is shared with the communication device.

11. The apparatus set forth in claim 1, further comprising a cassette lid; and
    a sensor to detect the status of a cassette lid coupled with the controller.

12. The apparatus set forth in claim 11, wherein the controller is operable to store data representative of the cassette lid being opened responsive to the sensor detecting the cassette lid being opened.

13. The apparatus set forth in claim 12, further comprising:
    a sensor which monitors rotation of a feed wheel mechanism in the cassette coupled with the controller; and
    wherein the feed wheel is arranged to not turn when the cassette is not in the operating position.

14. The apparatus set forth in claim 13, wherein the controller is operable to record as an incident the feed wheel turning when the cassette is not in the operating position.

15. The apparatus set forth in claim 1, further comprising:
    a sensor which monitors rotation of a feed wheel mechanism in the cassette coupled with the controller; and
    wherein the feed wheel is arranged to not turn when the cassette is not in the operating position.

16. The apparatus set forth in claim 15, wherein the controller is operable to record as an incident the feed wheel turning when the cassette is not in the operating position.

17. The apparatus set forth in claim 1, further comprising a rectifier having an input coupled with the first coil.

18. The apparatus set forth in claim 17, further comprising a buck converter coupled with an output of the rectifier.

19. The apparatus set forth in claim 1, wherein the first coil and second coil are printed circuit board (PCB) coils.

20. The apparatus set forth in claim 1, wherein the controller employs amplitude shift keying to communicate with the automated banking machine.

* * * * *